Patented Nov. 1, 1949

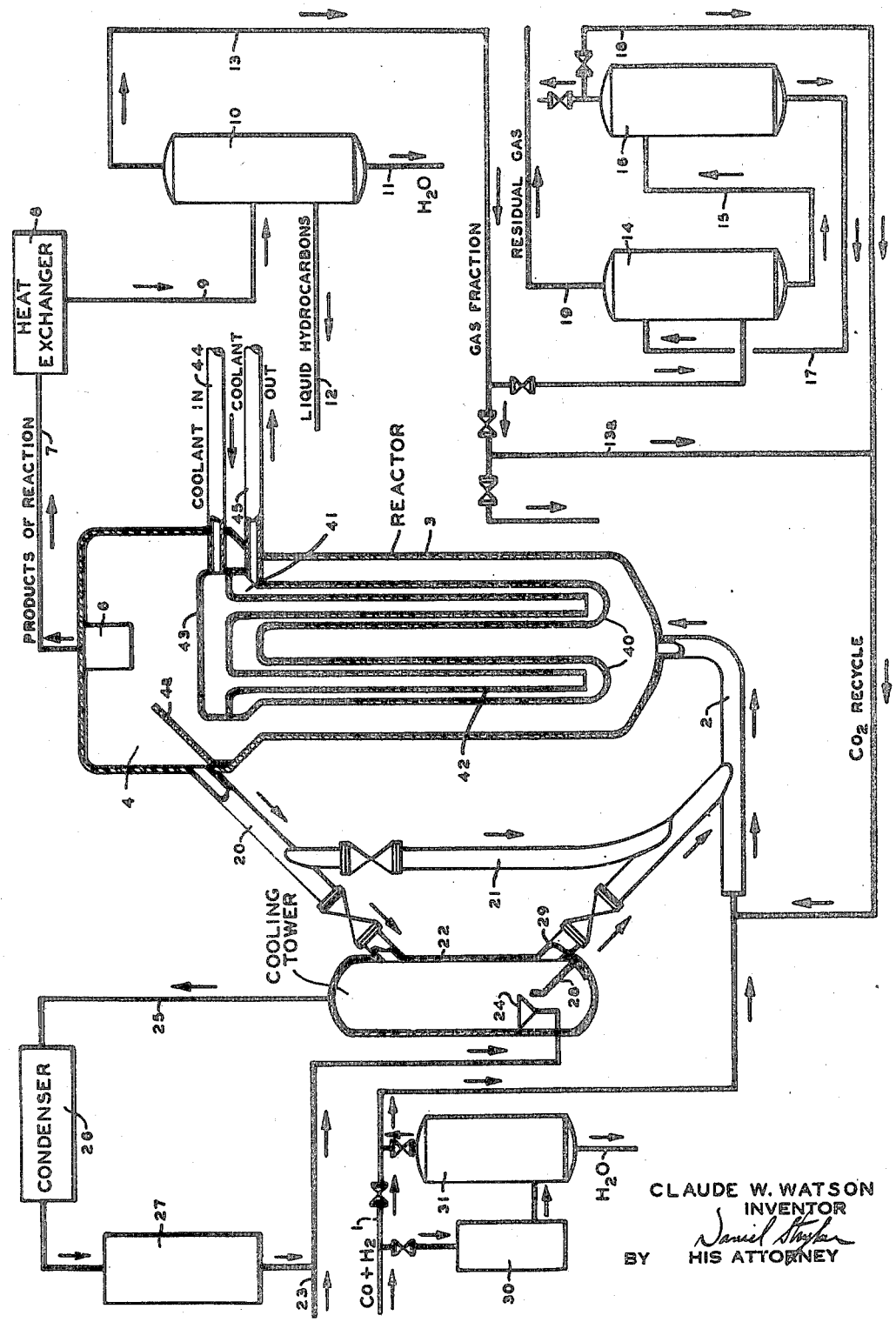

2,486,895

UNITED STATES PATENT OFFICE 2,486,895

PROCESS FOR CATALYTIC CONVERSION OF CARBON OXIDES

Claude W. Watson, Scarsdale, N. Y., assignor to The Texas Company, New York, N. Y., a corporation of Delaware Application December 7, 1945, Serial No. 633,481

6 Claims. (Cl. 260—449.6)

This invention relates to the catalytic conversion of carbon oxides and hydrogen into hydrocarbons, oxygenated hydrocarbons and the like.

The invention contemplates effecting the synthesis of hydrocarbons and the like from carbon monoxide and hydrogen in the presence of added or recycled carbon dioxide by contact with an active synthesis catalyst comprised in part of a catalytic agent effective for catalyzing the water gas shift reaction, i. e., the reaction of carbon dioxide with hydrogen to form carbon monoxide and steam.

As disclosed in my co-pending application, Serial No. 630,521, for Process for catalytic conversion of carbon oxides, it is advantageous to effect the contact of carbon monoxide and hydrogen with a conventional synthesis catalyst in the presence of sufficient added or recycled carbon dioxide so as to materially reduce the production of methane and substantially inhibit the net production of carbon dioxide. By recycling carbon dioxide in substantial amount under specified conditions of operation prevailing within the reaction zone substantially complete conversion of carbon monoxide passing to the reaction zone into higher molecular weight compounds is secured, as for example 99% conversion or in the range 95 to 99.5% conversion.

The present invention contemplates effecting the conversion reaction in the presence of a synthesis catalyst in which is incorporated or with which is associated a catalytic agent effective for catalyzing the water gas shift reaction under the conditions of temperature and pressure prevailing within the synthesis reaction zone so as to reduce substantially the amount of recycled or added carbon dioxide.

Catalysts suitable for the promotion of the aforesaid water gas shift reaction are iron oxides promoted by such oxides as those of cerium, chromium, calcium and magnesium. A specific example of a useful water gas shift reaction catalyst is one consisting of about 55% $Fe_2O_3$, 8% $Cr_2O_3$, 26% CaO, 4% $Al_2O_3$, and 7% MgO, although other effective compositions containing a minor proportion of an oxide such as $Cr_2O_3$ may be used.

In accordance with the invention, the water gas shift reaction catalyst may comprise an integral component of the synthesis catalyst or may be a separate and distinct catalyst in physical association with a conventional synthesis catalyst. Examples of conventional synthesis catalysts with which the water gas shift reaction catalyst may be physically associated in the reaction zone are metals of the iron group and which includes besides iron, nickel, cobalt, ruthenium, etc. These metals may be employed in association with a supporting or carrier material and also with suitable promoting agents if desired.

An effective synthesis catalyst comprises iron powder containing about 1 to 2% potassium oxide ($K_2O$) and about 2 to 3% alumina ($Al_2O_3$). An example of a supported catalyst is one comprising about 32% cobalt, 64% Filter Cel (diatomaceous earth composed of silica and aluminum silicate) and about 34% thorium and magnesium oxides. Examples of other useful promoters are the oxides of uranium and vanadium, while examples of other supporting materials are diatomaceous earth, silica gel, Filtrols (acid-activated bentonite), etc.

The active agent for catalyzing the shift reaction appears to be the oxide from a metal such as chromium, whereas the essential active agent for the synthesis of hydrocarbons from carbon monoxide and hydrogen is a metal of the iron group in a form available for carbide formation during the conversion reaction.

An advantageous means of employing a physical mixture of the two catalysts is in the form of a fluidized mass of the two catalysts. If, due to difference in particle density or other fluidization characteristics, segregation or classification of the catalysts occurs within the reaction zone, provision may be made for recirculation of the catalyst through the reaction zone as will be described in connection with the drawing.

Reference will now be made to the accompanying drawing showing one means of practicing the invention.

Synthesis gas containing carbon monoxide and hydrogen at a temperature in the range about atmospheric to 550° F. is conducted from a source not shown through a pipe 1 into a catalyst conduit 2 leading to the bottom of a reactor 3. Advantageously the synthesis gas contains at least about 2 mols of hydrogen per mol of carbon monoxide and preferably is substantially free from water or is no more than saturated with water at the temperature of the total feed to synthesis reactor.

The reactor 3 comprises a vertical vessel containing a mass of powdered catalyst mixture. One component of the catalyst mixture is a synthesis catalyst comprising iron powder containing about 1 to 2% potassium oxide and about 2 to 3% alumina. The other component comprises a water gas shift reaction catalyst containing a substantial amount of chromium oxide and such as previously referred to. The catalyst powder advantageously comprises particles ranging from about 100 to 400 mesh, the distribution of particle size being such as to assure uniform fluidization along the vertical dimension of the reaction vessel.

The upper portion of the reactor 3 is advantageously enlarged to provide a settling space 4 in the lower portion of which accumulates a body or head of catalyst powder.

The numeral 6 designates a filter element formed from a porous refractory material such as Alundum (fused alumina) through the pores of which the gaseous and vaporous products of reaction pass while the catalyst powder is retained within the space 4.

The effluent stream of reaction mixture comprising carbon dioxide, unreacted carbon monoxide and hydrogen, hydrocarbons and water is conducted through a pipe 7 to an exchanger 8 wherein the stream is cooled to a temperature of about 60 to 150° F. The cooled stream then flows through pipe 9 to a separator 10 wherein water and higher molecular weight hydrocarbons contained in the effluent are condensed, leaving a gaseous fraction comprising carbon dioxide, unreacted carbon monoxide and hydrogen and hydrocarbons having from 1 to 5 carbon atoms per molecule.

Water may be drawn off through a pipe 11 while condensed hydrocarbons are drawn off through a pipe 12. The gaseous fraction, advantageously a major portion thereof, is conducted through a pipe 13 to an absorption tower 14 wherein it is subjected to countercurrent contact with a suitable scrubbing liquid such as ethanolamine under conditions effective to absorb carbon dioxide therefrom. The portion not so scrubbed is recycled to the reactor through branch pipe 13a and pipe 18.

The scrubbing agent enriched with carbon dioxide is drawn off through a pipe 15 to a stripping tower 16 wherein the carbon dioxide is expelled from the scrubbing agent, the latter being returned through pipe 17 to the tower 14.

The expelled carbon dioxide is removed through pipe 18 through which it is returned to the reactor 3 as indicated.

Residual gas and light hydrocarbons are removed from the top of the absorption tower 14 through pipe 19 and disposed of as desired. For example, unreacted carbon monoxide and hydrogen may be separated from these gases for recycling to the reactor. If desired, the lighter gaseous hydrocarbons may be recycled in part to the reactor.

Referring again to the reactor 3, provision is made for continously removing from the upper portion thereof a stream of catalyst powder through a conduit 20. From the conduit 20 the catalyst powder may be discharged through conduit 21 to the previously-mentioned catalyst conduit 2 through which the fresh synthesis gas and recycling carbon dioxide enters the reactor 3. The entering stream of reactant gas, aided by the static head of catalyst in the standpipe 21, is thus employed to force the recycled catalyst into the reactor.

If desired, the catalyst being drawn off through conduit 20 may be cooled prior to return to the reactor 3. In such case, the catalyst is diverted to a cooling tower 22 wherein cooling may be effected by subjecting the catalyst powder to intimate contact with an atomized liquid, vaporizable under the conditions of temperature and pressure prevailing therein.

For example, when operating the reactor 3 to produce hydrocarbons the temperature at the exit from the reactor may be about 600° F. with a pressure of about 200 pounds per square inch gauge. The withdrawn catalyst is thus at a temperature of about 600° F. and may be cooled in the tower 22 by contact with atomized hydrocarbon liquid such as pentane or a pentane-hexane fraction of saturated hydrocarbons. The pentane may be drawn initially from a source not shown through a pipe 23 from which it is injected through a spray 24 located within the bottom portion of the tower 22. If desired, a plurality of atomizing sprays may be employed at successive points along the vertical dimension of the tower. Advantageously, the volume of vapor rising through the tower 22 is sufficient to maintain the catalyst powder in a fluidized state. In other words, the introduction of atomized liquid is regulated so as to avoid "mudding" of the powder.

The effluent stream of vaporized hydrocarbon escapes from the top of the tower through a pipe 25. It will be understood that a filter element not shown may be located at the top of the tower similar to the filter element 6 in the top of the reactor 3 for the purpose of removing entrained powder from the effluent vapor.

The effluent vapor is cooled and condensed in a condenser 26, passing to an accumulator 27 from which it may be recycled through the pipe 23.

The catalyst powder cooled to a temperature of about 500 to 550° F., or to such temperature as desired, accumulates behind a baffle 28 within the bottom portion of the tower 22, and is withdrawn therefrom through a conduit 29 which communicates with the previously-mentioned conduit 21.

The temperature of the entering stream of carbon monoxide, hydrogen and recycled carbon dioxide may be regulated by passage through a heat exchanger 30 prior to contact with the catalyst. The temperature may be reduced sufficiently to condense moisture from the gas, which can be removed from the separator 31. If desired, the temperature of the entering gas and that of the recycled catalyst is adjusted so that the temperature in the lower portion of the reactor 3 in the region of initial contact between synthesis feed gas and catalyst is at least 10° F. lower than the temperature prevailing in the upper portion of the reactor. For example, with the aforementioned iron catalyst the catalyst temperature in the region of initial contact between synthesis gas and catalyst may be about 550° F. or lower, while the temperature in the upper portion of the reactor is maintained at about 600° F.

Temperature of the catalyst mass is regulated in the main by removal of heat of reaction with a cooling fluid flowing through a heat exchange element located within the reactor 3. This element may comprise a plurality of depending tubes 40 closed at the bottom end and with their upper ends terminating in a chamber 41. Within each tube 40 is an inner tube 42 open at its lower end and with its upper end terminating in a chamber 43. Cooling liquid such as water is introduced through a pipe 44 to the chamber 43 from which it flows down through tubes 42. It then flows upwardly through the annular space over the interior surfaces of tubes 40 in indirect heat exchange relationship with the catalyst. The hot water or steam passes into chamber 41 and is discharged therefrom through a pipe 45.

Under these conditions, the predominating initial reaction in the lower portion of the reactor is $2Fe+CO+H_2=Fe_2C+H_2O$. Subsequently and above the lower portion, the predominating reaction is $Fe_2C+H_2=CH_2+2Fe$. At the higher temperature prevailing in the upper portion of the reactor the reaction $CO_2+H_2=CO+H_2O$ is favored.

As disclosed in my aforementioned co-pending application, methane formation is suppressed and the net production of carbon dioxide is materially reduced by controlling the composition of the reactant mixture passing to the reaction zone. Thus it is contemplated maintaining the ratio of mols of hydrogen to mols of both carbon monoxide and carbon dioxide passing to the reaction zone not in excess of 1 and preferably not less than about 0.6.

In addition, it is contemplated maintaining the molar ratio $$\frac{CO_2(H_2 - 2COA)}{CO \times H_2O}$$

of reactants passing to the reaction zone substantially greater than the numerical value of the equilibrium constant for the water gas shift reaction at the temperature prevailing in the reaction zone or stage, where A is the fraction of the carbon monoxide which will be converted in that stage. This fraction may range from 0.95 to 0.995.

The equilibrium constant K for the water gas shift reaction can be expressed as $$K = 0.0202 e^{\frac{(7350)}{(T+400)}}$$

where e is the base of Napierian logarithms, e. g., 2.7183, and T is the reaction temperature in degrees Fahrenheit.

The value of K ranges from 70 for a reaction temperature of about 500° F. to a value of 16 for a reaction temperature of about 700° F., and is about 31 for a reaction temperature of about 600° F.

When the reactants are subjected to contact with a catalyst comprising iron powder in a state of dense phase fluidization at a temperature of about 600° F. and in the absence of the added water gas shift reaction catalyst the second mentioned molar ratio generally must be in the range of about 100 to 160.

In accordance with the present invention, by employing a water gas shift reaction catalyst in conjunction with the conventional catalyst this molar ratio may be reduced substantially so that it exceeds K by a smaller amount. Thus the molar ratio in question may have a numerical value of about 1.25 to 1.5 times the value of the equilibrium constant K. This means that the volume of carbon dioxide required for recycling is substantially reduced while still realizing a relatively high conversion of the available carbon in the synthesis feed gas into desirable compounds, for example $C_2$ and higher molecular weight hydrocarbons.

Not only is it contemplated avoiding substantially entirely the net production of carbon dioxide when charging a synthesis gas containing at least 2 mols of hydrogen per mol of carbon monoxide, but in addition it is contemplated effecting substantial consumption of carbon dioxide in the synthesis.

The amount of carbon dioxide added or recycled to the reaction zone depends upon the composition of the synthesis feed gas passing thereto. Thus if the hydrogen present is less than that theoretically required to react with the carbon monoxide present to produce olefins and water, then the amount of carbon dioxide added or recycled is less since carbon dioxide is of necessity produced in the reaction under such conditions.

Under ordinary circumstances, the synthesis of hydrocarbons from carbon monoxide and hydrogen is accompanied by the formation of large amounts of carbon dioxide. Carbon dioxide so produced apparently results in some measure in the carbiding reaction between the catalyst metal and carbon monoxide, which reaction is regarded as an essential one from the standpoint of maintaining an excess of the carbide in the reaction.

A feature of the invention involves effecting consumption of carbon dioxide so produced in this carbiding reaction by reacting it with available hydrogen to form additional carbon monoxide for use in the synthesis. Consumption of carbon dioxide in this manner is promoted by the presence of the water gas shift reaction catalyst.

While a single reactor or reaction stage is referred to in the description of the drawing, nevertheless it is contemplated that a plurality of reaction zones or stages may be employed. In such case the effluent stream from a preceding stage after removal of water and all or a portion of the hydrocarbons is passed to a succeeding stage. The removal of water between stages thus permits decreasing the concentration of water in the succeeding stages. With a plurality of reactors fresh feed gas should be introduced in parallel flow to succeeding stages, while the carbon dioxide and hydrogen are recycled to the initial stage of the series.

In any case, the composition of the reactants entering each reaction stage is regulated so as to maintain the foregoing molar relationships.

By way of illustration, carbon monoxide and hydrogen are subjected to contact with a fluidized catalyst at a temperature of approximately 600° F. and under a pressure of approximately 200 pounds per square inch gauge. In cases I and II, the catalyst consisted solely of the previously-mentioned synthesis catalyst comprising iron powder containing small amounts of potassium oxide and alumina and referred to in connection with the description of the reactor 3. In case III, the catalyst comprised the aforementioned iron catalyst in admixture with an equal portion by weight of the water gas shift reaction catalyst specifically referred to in connection with the description of the reactor 3.

In case I, the carbon dioxide constitutes 6.0 mol per cent of the reactants, i. e., the carbon dioxide is 6.0% of the sum of the $H_2$, CO, $H_2O$ and $CO_2$. In case II, the $CO_2$ constitutes about 50 mol per cent of the reactants, and in case III about 35 mol per cent. The following tabulation compares the molar relationships at the inlet to the reaction zone in each case and also the yields.

| | Case I | Case II | Case III |
|---|---|---|---|
| $\frac{\text{Mols of } H_2}{\text{Mols of } CO+CO_2}$ | 2.22 | 0.63 | .94 |
| $\frac{CO_2 \times (H_2-2COA)}{CO \times H_2O}$ | 16 | 164 | 41 |
| Yields in cubic centimeter per cubic meter of fresh feed: | | | |
| $C_3$ and heavier hydrocarbons | 179 | 222 | 230 |
| Water | 167 | 258 | 263 |
| Water soluble oxygenated compounds | 9 | 29 | 16 |
| Yields as mol per cent of carbon monoxide converted: | | | |
| $CO_2$ | 20.9 | −13.9 | −13.9 |
| $C_1+C_2$ hydrocarbons | 16.6 | 3.6 | 3.6 |
| $C_3$ and heavier hydrocarbons | 60.2 | 100.7 | 102.5 |
| Water soluble oxygenated compounds | 2.3 | 5.5 | 3.0 |
| | 100.0 | 95.9 | 95.0 |

The foregoing tabulation reveals that the addition of a substantial quantity of carbon dioxide to the reactor feed eliminates the net production of carbon dioxide and materially reduces the formation of methane. Case III shows that the employment of a water gas shift reaction catalyst in conjunction with the synthesis catalyst substantially reduces the amount of carbon dioxide recycled or added to the reaction.

In both cases II and III, carbon dioxide is consumed in the synthesis as indicated by a net disappearance of carbon dioxide. The yield of $C_3$ and heavier hydrocarbons is very much larger in cases II and III than in case I where the feed contained a relatively small concentration of carbon dioxide, namely about 5.8 mol per cent. In starting up the plant, carbon dioxide may be supplied from an extraneous source, its use being continued until a sufficient quantity of carbon dioxide is accumulated for recycling.

While specific temperatures have been referred to, it is contemplated that the temperatures employed will depend upon the catalysts used and the particular products desired. The temperatures may range, for example, from 200 to 700° F. Likewise, pressures may range from atmospheric to several hundred atmospheres.

Referring to the heat exchange element within the reactor 3, it will be understood that the chambers or headers 41 and 43 are provided with a plurality of openings or passages, not shown, through which the powdered catalyst and vapor rise into the space 4. A portion of the catalyst powder accumulates above the baffle 4a for discharge through the conduit 20.

Obviously many modifications and variations of the invention as above set forth may be made without departing from the spirit and scope thereof, and therefore only such limitations should be imposed as are indicated in the appended claims.

I claim:

1. The process for the production of desired hydrocarbons, oxygenated hydrocarbons and mixtures thereof by the catalytic hydrogenation of carbon monoxide with the conversion of substantially all of the feed carbon monoxide into said desired products and with repressed formation of carbon dioxide, which comprises feeding a gaseous mixture of CO, $H_2$, $H_2O$ and $CO_2$ into a reaction zone containing a fluidized mixture of solid particle, iron containing, synthesis catalyst, together with discrete particles of water-gas shift catalyst, contacting said gaseous mixture with said fluidized catalyst mixture at a reaction temperature in the range of about 550–700° F. until about .95 to .995 of said feed carbon monoxide has been converted into desired products of reaction, maintaining the composition of said gaseous feed mixture such that the molar ratio of $H_2$ to CO is at least 2:1, the amount of $H_2O$ is not more than that corresponding to saturation at atmospheric temperature and the proportion of $CO_2$ is such that the molar ratio $$\frac{CO_2(H_2-2COA)}{CO \times H_2O}$$

is substantially greater than the equilibrium constant K for the water-gas shift reaction at the temperature prevailing in the reaction zone, where A is a constant between .95 and .995 representing the fraction of the feed CO which is to be converted into said desired products, withdrawing effluent products of reaction from the reaction zone, and recovering the desired products of reaction therefrom.

2. The method according to claim 1 wherein the molar ratio $$\frac{CO_2(H_2-2COA)}{CO \times H_2O}$$

is greater than about 1.25 times the value of the equilibrium constant K for the water-gas shift reaction at the temperature prevailing in the reaction zone.

3. The method according to claim 1 wherein the composition of the said gaseous feed mixture is such that the ratio of the mols of hydrogen to the sum of the mols of carbon monoxide and carbon dioxide is in the range of about 0.6 to 1.0.

4. The method according to claim 1 wherein the temperature prevailing in the inlet portion of the reaction zone is at least 10° F. lower than that prevailing in the outlet portion of the reaction zone.

5. The process according to claim 1 wherein the desired hydrocarbons, oxygenated hydrocarbons and mixtures thereof are composed predominantly of normally liquid fractions.

6. The process for the production of desired hydrocarbons, oxygenated hydrocarbons and mixtures thereof by the catalytic hydrogenation of carbon monoxide with the conversion of substantially all of the feed carbon monoxide into said desired products and with repressed formation of carbon dioxide, which comprises feeding a gaseous mixture of CO, $H_2$, $H_2O$ and $CO_2$ into a reaction zone containing a fluidized mixture of solid particle, iron containing, synthesis catalyst, together with discrete particles of water-gas shift catalyst, contacting said gaseous mixture with said fluidized catalyst mixture at a reaction temperature in the range of about 550–700° F. until about .95 to .995 of said feed carbon monoxide has been converted into desired products of reaction, maintaining the composition of said gaseous feed mixture such that the molar ratio of $H_2$ to CO is at least 2:1, the amount of $H_2O$ is not more than that corresponding to saturation at atmospheric temperature and the proportion of $CO_2$ is sufficient to repress action of the water-gas shift reaction in that direction which consumes CO and $H_2O$ with the formation of $CO_2$ such that conversion of feed CO into undesired $CO_2$ by the water-gas shift reaction is substantially inhibited, withdrawing effluent products of reaction from the reaction zone, and recovering the desired products of reaction therefrom.

CLAUDE W. WATSON.

REFERENCES CITED

The following references are of record in the file of this patent:

UNITED STATES PATENTS

| Number | Name | Date |
|---|---|---|
| 2,180,672 | Frey | Nov. 21, 1939 |
| 2,224,048 | Herbert | Dec. 3, 1940 |
| 2,248,099 | Linckh | July 8, 1941 |
| 2,253,607 | Boyd et al. | Aug. 26, 1941 |
| 2,257,293 | Dreyfus | Sept. 30, 1941 |
| 2,347,682 | Gunness | May 2, 1944 |
| 2,353,600 | Sweetser | July 11, 1944 |
| 2,414,276 | Sensel et al. | Jan. 14, 1947 |

OTHER REFERENCES

Berkman et al., "Catalysis," Reinhold, New York, 1940, page 749.